3,327,015
OLEFIN DIMERIZATION BY NICKEL COMPOUNDS

Ernst L. Th. M. Spitzer, Amsterdam, Netherlands, assignor to Shell Oil Company, New York, N.Y., a corporation of Delaware
No Drawing. Filed Mar. 24, 1964, Ser. No. 354,457
Claims priority, application Netherlands, Mar. 25, 1963, 290,631
10 Claims. (Cl. 260—683.15)

ABSTRACT OF THE DISCLOSURE

Monoolefin dimerization is carried out at atmospheric pressure and at a temperature of −20 to 40° C. in a liquid organic medium using a catalyst composition consisting essentially of a specific organic nickel compound in combination with an aluminum hydrocarbyl halide. Examples are given for propylene dimerization using the nickel salt of sulfonated $C_8$–$C_{13}$ alkylbenzenes and the nickel salt of sulfated propylene tetramer.

---

This invention relates to the dimerization of olefinic hydrocarbons consisting essentially of alpha-monoolefins. The invention relates more particularly to the catalytic dimerization of monoolefinic hydrocarbons comprising ethylene and/or propylene in the presence of an improved nickel-containing complex catalyst composition.

The dimers of monoolefinic hydrocarbons, particularly of the alpha olefins, such as, for example, propylene and ethylene dimers are of value in a wide field of applications. They constitute an important starting material in polymer chemistry. The dimers of propylene can be pyrolytically converted to isoprene and dehydrogenated to methylpentadiene, both products being attractive monomers for the manufacture of rubber-like polymers.

The usefulness of the alpha-olefin dimers has inspired the development of processes directed to their large-scale production. However, practical-scale utilization of catalytic processes disclosed heretofore are often handicapped by serious disadvantages unavoidably inherent therein which militate against efficient utilization. Certain of these processes rely upon the use of aluminum alkyls, either alone or in combination with "colloidal nickel." The relatively large amounts of highly reactive aluminum alkyls called for and the relatively high temperatures and pressures of necessity required therewith often present drawbacks to their use in practical-scale operation. Processes have been developed wherein catalysts consisting of certain nickel salts of organic or inorganic acids and certain organic nickel complexes are employed. However, the use of such materials as disclosed heretofore generally entails serious disadvantages including difficulties in operation due to low solubility or even insolubility of the catalysts or components thereof in the reaction medium, the high temperatures and/or pressures necessitated in their use and the relatively low yields of the desired dimers. Thus, the low or relative insolubility of the nickel salts or inorganic acids in the liquid organic diluents in the presence of which the reaction is preferably performed often renders their use impractical. The nickel salts of organic acids disclosed heretofore comprises, for example, the formate, acetate, oxalate, citrate, tartrate, succinate, and cyanide, which do not dissolve, or dissolve only very slightly, in the organic media generally employed. The nickel complexes heretofore proposed comprise, for example, the triaryl phosphine-nickel carbonyl complexes, nickel complexes with alpha-dimethylglyoxime and nitroprusside $(Na_2[Fe(NO)(CN)_5] \cdot 2H_2O)$ nickel complexes with aniline and with hydrazine thiocyanate. Processes disclosed heretofore relying upon the use as catalysts or components thereof of such complexes generally necessitate the use of relatively elevated pressures, often up to 1000 p.s.i.g. and higher. The yields of the desired dimers obtained therewith are generally low, particularly at low pressures desired in practical-scale operation.

A further disadvantage of processes disclosed heretofore is their inability to convert propylene to a product containing substantial amounts of 2-methylpentene-2, the dimer most readily directly pyrolyzed to isoprene without need for intermediate isomerization.

It is therefore an object of the present invention to provide an improved process enabling the more efficient catalytic dimerization of alpha-monoolefinic hydrocarbons wherein the above difficulties are obviated to at least a substantial degree.

Another object of the present invention is the provision of an improved process enabling the more efficient dimerization of alpha-monoolefin at relatively low temperatures and pressures substantially below 100 p.s.i.g. and preferably about atmospheric.

Another object of the present invention is the provision of an improved process enabling the more efficient dimerization of ethylene and/or propylene at substantially atmospheric pressure.

A particular object of the present invention is the provision of an improved process enabling the more efficient catalytic conversion of propylene to propylene dimers predominating in 2-methylpentene-2.

Other objects and advantages of the present invention will become apparent from the following detailed description thereof.

In accordance with the present invention, dimers of alpha-monoolefins are produced by contacting said alpha-monoolefins, in a liquid medium, at a temperature of from about −20 to about 40° C., in the presence of a catalyst composition consisting essentially of (a) a nickel compound, having substantial solubility in said liquid reaction medium, represented by the empirical formula:

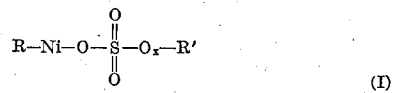

(I)

wherein

R and R' each represent the same or a different member of the group consisting of an organic, preferably hydrocarbyl radical, as alkyl, cycloalkyl, alkylene, aryl, alkaryl, and aralkyl, having up to 20 carbon atoms; and R can additionally represent:

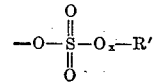

wherein

R' has the meaning given therefor above;
and $x$ is a number having a value of from 0 to 1;
in combination with an aluminum hydrocarbyl halide.

By "substantial solubility in the liquid reaction medium" as used herein and the appended claims is meant a solubility of at least 100 milligrams per liter liquid reaction medium under the reaction conditions employed.

Without intent to limit in anywise the scope of the present invention by theory advanced herein to set forth more fully the nature of the invention, it is indicated that the nickel-containing components of the catalyst composition employed may be regarded as complexes wherein structure is probably characterized by nickel atoms with four ligands in square planar configuration.

In the suitable nickel component of the catalyst composition defined by foregoing Formula I, each R' and R when a hydrocarbyl group of up to twenty carbons includes: alkyl and alkylene groups of branched, straight chain, and cyclic structure, as methyl, ethyl, propyl, isopropyl, butyls, pentyls, hexyls, octyls, decyls, dodecyls, phenyl, and mono- and poly-alkyl-substituted phenyl groups wherein the alkyl substituents may be of branched or straight chain structure, as methyl, ethyl, isopropyl, n-butyl, tert. butyl, pentyls, hexyls, etc. The suitable nickel compounds furthermore comprise those wherein one or more hydrogen atoms are substituted by inorganic substituents such as halogen, preferably middle halogen, hydroxyl, amino, imino, or mercapto groups. Compounds wherein R' and R when hydrocarbyl each contain up to 12 carbons are somewhat preferred.

Preferred nickel-containing compounds within the above-defined class comprise those wherein R in the foregoing Formula I is

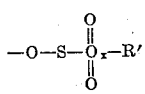

as defined above, that is, the compounds represented by the formula:

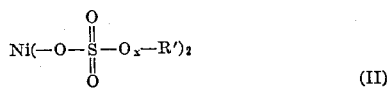

wherein R' and $x$ have the same meaning as defined above in Formula I. Comprised in this preferred group are the nickel compounds of alkylarylsulfonic acids or mixtures thereof. Particularly preferred are those wherein the aryl group of these sulfonic acids is a phenyl or naphthyl group. These aryl groups then carry one or more, preferably branched, alkyl groups, while the number of sulfonic acid groups is also one or more than one. The presence of at least one branched alkyl group with more than three carbon atoms is preferred with a view to the solubility of the nickel compound in the reaction medium.

The suitable sulfonic acids can be prepared by sulfonation of products obtained by alkylation of benzene or naphthalene with olefins, for example, olefins containing 8–18 carbon atoms, or with a mixture of olefins containing about 8–18 carbon atoms, or with fractions of such mixtures.

The alkylation may, for instance, have been carried out in the presence of HF at 5° C., the sulfonation with the aid of oleum, for example, with 23% oleum at 55° C. at a molar ratio of $SO_3$ to alkylate of 3:1. Preferred are the products of alkylations performed with mixtures of olefins formed by cracking liquid, semisolid or solid paraffinic hydrocarbons. Other suitable alkylating agents comprise, for instance, propylene trimer and/or tetramer.

Organic half esters of sulfuric acid can be prepared, for instance, by sulfation of the suitable olefins or mixtures of olefins, by means of sulfuric acid, for instance, 98% $H_2SO_4$ at 20° C. and at a molar ratio of $H_2SO_4$ to olefins of 1:1.

Nickel compounds used in the process of the invention also can be prepared from sulfonic acids by boiling these with 5% excess nickel hydroxide in the presence of benzene as medium (the water formed being removed azeotropically) or by converting the alkali or earth alkali sulfonates with the aid of ion exchangers with, for instance, nickel chloride.

When sulfates are desired, these can be obtained by neutralizing the sulfation products directly with $Ni(OH)_2$.

Essential to the attainment of the objects of the present invention is the use in combination of the above-defined nickel compounds, or complexes (I) with the aluminum hydrocarbyl halide. The specific combination now enables the dimerization to proceed efficiently in its presence at pressures as low as substantially atmospheric pressure.

Suitable aluminum hydrocarbyl halides employed as the aluminum-containing component of the catalyst composition are, for example, aluminumalkyl dichloride, aluminumdialkyl chloride, and aluminumalkyl sesquichloride, wherein the alkyl groups have up to twelve carbons. Those wherein the alkyl group is lower alkyl, for example, up to butyl are preferred; those wherein the alkyl group is ethyl being particularly preferred.

The ratio of organic nickel compound to aluminum hydrocarbyl compound in the catalyst composition is generally so chosen that per atom of nickel there are about 2 to about 100 atoms of aluminum of the aluminum hydrocarbyl halide present. Preferably, care is taken that per atom of nickel there are about 5 to about 30 atoms of aluminum of the hydrocarbyl halide present. The nickel concentration in the organic medium is usually between 0.2 and 8 milliatoms per liter and preferably 0.3 to 3 milliatoms per liter.

The catalyst components may be introduced into the reaction zone separately or in a premixed state. The catalyst components, or mixture thereof, may be added to the hydrocarbon feed or to a separate portion of the diluent, or solvent, fed and/or to a recycle stream emanating from product and/or catalyst recovery. When the catalyst components are premixed, the premixing may be carried out at ambient or elevated temperatures.

The process of the invention is applied to the alpha monoolefinic hydrocarbons broadly. Particularly suitable alpha-monoolefins comprise the 1-olefins having up to eight carbons. The process is applied with particular advantage to the dimerization of ethylene, propylene, and 1-butene. A signal advantage of the present invention resides in its ability to dimerize propylene to propylene dimers predominating in 2-methylpentene-2. The charge may comprise a plurality of olefins, thereby resulting in the obtaining of products comprising codimers of olefins charged.

The process is executed in liquid phase in the presence of a substantially inert organic liquid in which the nickel-containing component of the catalyst possesses substantial solubility. Suitable solvents comprise, for example, aromatic, aliphatic, and cycloaliphatic hydrocarbons, chlorinated hydrocarbons, mixtures thereof, etc., which are in the liquid state under the reaction conditions employed. Specific examples of such suitable solvents comprise butane, pentanes, octanes, hexanes, cyclohexane, benzene, toluene, xylene, saturated hydrocarbon fractions, dioxane, and the like. The specific solvent preferably employed will be governed to some extent by the specific catalyst components used and specific olefinic charge.

An important advantage inherent in the process of the invention is the ability to carry out the dimerization reaction efficiently at substantially room temperature and at about atmospheric pressure. Generally, operation at temperatures of from about −20 to about +40° C. and particularly from about −10 to about +20° C. at a low superatmospheric pressure, for example, up to about 2 atm. is preferred. Somewhat higher or lower temperatures may, however, be used within the scope of the invention. Slightly elevated pressures, for example, up to about 10 atmospheres, though generally not advantageous may be employed within the scope of the invention. The specific temperature and pressure preferably employed will depend to some extent upon the specific reactants, catalyst components, and solvent used.

Under the above-defined conditions, the olefin charged is converted to reaction products comprising the dimer thereof. Thus, ethylene is converted to butene, propylene to hexenes, butylene to octenes, etc. Mixed olefinic charge is converted to a product comprising codimers; thus, a charge comprising ethylene and propylene results in a reaction product comprising pentenes in addition to butylenes and hexylenes.

The dimeric product obtained will comprise various isomeric forms of the dimer. By control of reaction temperature and catalyst selection, the product distribution as well as yield is to some extent controlled.

As indicated above, a particular advantage of the present invention resides in its ability to dimerize propylene to the highly desirable 2-methylpentene-2 with unusually high yields. The reaction mixture may be subjected to a digestion stage after the reaction stage. In one embodiment of the invention, the reaction mixture is maintained at a temperature above that used in the reaction before effecting product separation. Thus, the dimerization reaction may be executed in a first stage at a temperature of from about −10° to about +40° C. and the resulting reaction mixture heated in a second (digestion) stage maintained at a temperature which is higher than that in the reaction stage, for example, in the range of from about 20 to about 100° C.

The concentration of the nickel compound was invariably 2 millimole per liter. The metal hydrocarbyl halide used in all experiments was $Al(C_2H_5)Cl_2$ in a concentration of 15 millimole per liter. Propene was passed through at a rate of 60 liters per hour. The exit gases were led through a vertical cooling device, where they were cooled to −30° C. Further conditions as well as the results are stated in the table. For comparison, data have been included on Experiments Nos. 4, 5, and 6 with two nickel compounds that are soluble in the reaction medium, but which are not comprised in the class of organic nickel complexes suitable for use in the presently claimed invention. All the nickel compounds in the concentrations mentioned were completely soluble in the relevant reaction medium under the reaction conditions employed.

TABLE

| Experiment No. | 1 | 2 | 3 | 4 | 5 | 6 |
|---|---|---|---|---|---|---|
| Organic medium | Mixture of 80% v. isooctane and 20% v. benzene | | | Isooctane | Isooctane | Benzene |
| Reaction volume, ml | 300 | 300 | 300 | 150 | 300 | 150 |
| Reaction temperature, °C | 30 | 10 | 10 | 10 | 0 | 5 |
| Nickel compound | Ni-salt of sulfonated $C_8$–$C_{13}$ alkylbenzenes | | Ni-salt of sulfated propylene tetramer | Ni-complex of n-heptane-2,3-dioxim | Triphenylphosphine-Ni-carbonyl complex | |
| Yield, g./l.$^{-1}$/h.$^{-1}$ | 223 | 536 | 150 | <4 | 9 | 6 |
| COMPOSITION OF REACTION PRODUCT, PERCENT W. | | | | | | |
| Hexene-1 / Hexene-3 trans | 4.8 | 4.4 | 4.5 | | | |
| Hexene-3 cis | 0.7 | 0.8 | 0.8 | | | |
| Hexene-2 cis | 3.9 | 3.7 | 2.4 | | | |
| Hexene-2 trans / 2-methylpentene-1 | 17.6 | 17.0 | 19.6 | Not analyzed in view of low yield. | | |
| 3-methylpentene-1 / 4-methylpentene-1 | 1.3 | 0.8 | 1.4 | | | |
| 2,3-dimethylbutene-2 | 4.3 | 3.7 | 2.3 | | | |
| 2-methylpentene-2 | 36.5 | 37.6 | 25.3 | | | |
| 4-methylpentene-2 trans | 27.0 | 28.2 | 38.1 | | | |
| 4-methylpentene-2 cis | 3.9 | 3.8 | 5.0 | | | |

Upon completion of the reaction, the reaction mixture is subjected to suitable product separating means comprising one or more such conventional steps as fractional cooling, condensation, fractional distillation, decantation, filtering, solvent extraction, extractive distillation, adsorption, and the like.

Unreacted olefins, solvent and/or catalyst composition or components thereof may be recycled in part or entirely to the reaction zone. Charge to the process, as well as recycle streams, may be subjected to suitable treatment to effect the removal of undesirable components therefrom.

*Example*

A series of propene dimerizations were carried out under nitrogen and with vigorous stirring in isoctane, benzene or a mixture thereof, the following nickel compounds being used according to the invention:

(a) in Experiments Nos. 1 and 2 the nickel salt of an alkylbenzenesulfonic acid which had been obtained by alkylating benzene in the presence of HF at 5° C. with a mixture of $C_8$–$C_{13}$ cracking olefins (molar ratio of benzene to cracking olefins=10:1; weight ratio of HF to total hydrocarbons=1:2) and sulfonating the alkylate mixture, after rectification, in the manner specified in the description; and (b) in experiment No. 3, the nickel salt of a monoalkyl ester of sulfuric acid which had been prepared by sulfating propylene tetramer with 98% $H_2SO_4$ in a molar ratio of 1:1 at 20° C.

I claim as my invention:

1. The process for converting an alpha-monoolefinic hydrocarbon to a reaction product consisting essentially of dimers of said olefinic hydrocarbon which consists of contacting said olefinic hydrocarbon in liquid phase at a temperature of from about −20 to about +40° C. in the presence of an organic solvent, with a catalyst composition consisting essentially of a nickel-complex having the formula:

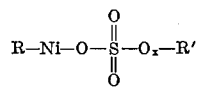

wherein R′ represents a hydrocarbyl group having up to 20 carbon atoms; and R represents R′ or the group:

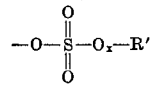

wherein R′ has the meaning given above; and x is a whole number having a value of 0 to 1; in combination with an aluminumhydrocarbyl halide.

2. The process for converting an alpha-monoolefinic hydrocarbon having up to 8 carbons to the molecule to a reaction product consisting essentially of dimers of said olefinic hydrocarbon which consists of contacting said olefinic hydrocarbon in liquid phase at a temperature of from about −20 to about +40° C., in the presence of a hydrocarbon solvent, with a catalyst composition consisting essentially of a nickel-complex having the formula:

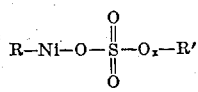

wherein R' represents a hydrocarbyl group having up to 20 carbon atoms; and R represents R' or the group:

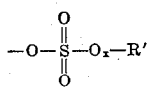

wherein R' has the meaning given above; and $x$ is a whole number having a value of 0 to 1; in combination with an aluminumalkyl chloride wherein the alkyl constituent contains up to 12 carbons.

3. The process in accordance with claim 2 wherein said olefinic hydrocarbon is propylene.

4. The process for converting an alpha-monoolefinic hydrocarbon having up to eight carbon atoms to the molecule to a reaction product consisting essentially of dimers of said olefinic hydrocarbon which consists of contacting said olefinic hydrocarbon in liquid phase, at a temperature of from about −20 to about 40° C., in the presence of an organic solvent, with a catalyst composition consisting essentially of nickel compound of the formula:

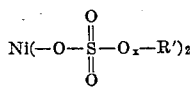

wherein R' represents a hydrocarbyl group having up to 20 carbon atoms; and $x$ is a whole number having a value of 0 to 1; in combination with an aluminumalkyl chloride wherein the alkyl constituent contains up to 12 carbons.

5. The process of claim 4 wherein R' is an alkyl group.

6. The process of claim 4 wherein R' is an alkaryl group.

7. The process in accordance with claim 6 wherein said nickel compound is a salt of an alkarylsulfonic acid obtained by sulfonation of an alkylated benzene produced by the alkylation of benzene with olefinic hydrocarbons.

8. The process for the production of propylene dimer which consists of contacting propylene, in liquid phase, at a temperature of from about −20 to about 40° C., in the presence of a hydrocarbon solvent, with a catalyst composition consisting essentially of the nickel salt of sulfonated $C_8$–$C_{13}$ alkyl benzenes in combination with an aluminumalkyl chloride wherein said alkyl constituent contains up to twelve carbon atoms.

9. The process for the production of propylene dimer predominating in 2-methylpentene-2 which comprises contacting propylene at a temperature of from about −20 to about 40° C., with a liquid reaction medium consisting essentially of a hydrocarbon solvent and an amount of catalyst composition consisting essentially of nickel salt of sulfonated $C_8$–$C_{13}$ alkyl benzenes in combination with an aluminumalkyl chloride to result in a nickel concentration of from about 0.2 to about 8 milliatoms per liter of said reaction medium.

10. The process for the production of propylene dimer predominating in 2-methylpentene-2, which comprises contacting propylene at a temperature of from about −10 to about +10° C., with a liquid reaction medium consisting essentially of a hydrocarbon solvent solution of a catalyst composition consisting essentially of nickel salt of sulfonated $C_8$–$C_{13}$ alkyl benzenes in combination with aluminummethyl sesquichloride, said catalyst combination containing from about 2 to about 100 atoms of aluminum per atom of nickel, and said reaction medium containing from about 1.5 to about 2 millimoles of said nickel salt of sulfonated $C_8$–$C_{13}$ alkyl benzene per liter.

References Cited

UNITED STATES PATENTS 3,096,385 7/1963 McConnell et al. __ 260—683.15
3,271,468 9/1966 Wilke et al. _____ 260—666 X PAUL M. COUGHLAN, JR., *Primary Examiner.*